Nov. 14, 1961 D. W. ROBSON 3,009,120

ELECTRIC FILTER ARRANGEMENTS

Filed Dec. 9, 1955

INVENTOR
DAVID WILLIAM ROBSON
BY
[signature]
ATTORNEY

United States Patent Office 3,009,120

Patented Nov. 14, 1961

3,009,120

ELECTRIC FILTER ARRANGEMENTS

David William Robson, Stoke, Coventry, England, assignor to The General Electric Company Limited, London, England Filed Dec. 9, 1955, Ser. No. 552,018
Claims priority, application Great Britain Dec. 10, 1954
8 Claims. (Cl. 333—72)

This invention relates to electric filter arrangements and is more particularly concerned with filter arrangements having a band-stop characteristic.

In carrier telephony systems it is well known to transmit a pilot signal in the form of a steady tone of constant frequency for the purpose of regulation at the receiving terminal or an intermediate station of the system. The pilot signal may be combined with the required carrier signals in frequency multiplex and it is then frequently desirable at a terminal or intermediate station of the system to be able to remove the pilot signal leaving only the carrier signals. This may be done by means of a band-stop filter but it is undesirable for such a filter to have a wide stop band.

It is one object of the present invention to provide a filter arrangement that has a relatively narrow stop band.

According to the present invention, an electric filter arrangement comprises a band-stop filter and a band-pass filter that are connected in parallel relationship and a piezo-electric crystal that is connected between two points in the band-pass filter, apart from the crystal there being a relatively high impedance between said points in the pass band of the band-pass filter and a frequency at which the said crystal is in series resonance lying within both the pass band of the band-pass filter and the stop band of the band-stop filter, which bands are substantially complementary, so that the filter arrangement has a relatively narrow stop band in the region of the said frequency at which the crystal is in series resonance while other series resonances of the crystal lie at frequencies outside the pass band of the band-pass filter.

It will be appreciated that a series resonant crystal connected across a line would provide a filter arrangement having the desired relatively narrow stop band, say 300 cycles per second on either side of the frequency at which the crystal is in series resonance, but, in addition, other stop bands would occur in the region of the spurious resonances of the crystal. It is, of course, undesirable that any such stop bands should occur within the range of frequencies to be transmitted over the line and the effect of these spurious resonances is eliminated or reduced in a filter arrangement in accordance with the present invention.

If a filter arrangement in accordance with the present invention is required to have a wider, although still relatively narrow, stop-band than is obtainable with a single piezo-electric rystal, a plurality of piezo-electric crystals that are series resonant at slightly different frequencies may be connected in parallel relationship.

Three examples of electric filter arrangements in accordance with the present invention will now be described with reference to the three figures of the accompanying drawing which show respectively the circuit diagrams of the three arrangements.

Figure 1:
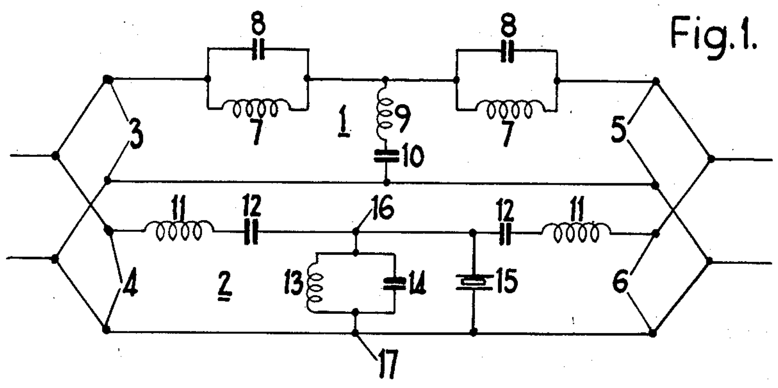

Referring now to FIGURE 1, the filter arrangement consists of band-stop filter 1 and a band-pass filter 2, the two input terminals 3 of the band-stop filter 1 being connected in parallel with the two input terminals 4 of the band-pass filter 2 while the output terminals 5 and 6 are similarly connected in parallel. The stop band of the band-stop filter 1 and the pass band of the band-pass filter 2 are complementary.

Considering now this arrangement in more detail, the band-stop filter 1 consists of a T-network, each of the series arms being formed by an inductor 7 that is connected in parallel with a capacitor 8 while the shunt arm is formed by an inductor 9 in series with a capacitor 10, the two series arms being in parallel resonance and the shunt arm in series resonance at the mid-frequency of the stop band. The band-pass filter 2 consists also of a T-network, each of the series arms thereof being formed by an inductor 11 in series with a capacitor 12 while the shunt arm is formed by an inductor 13 in parallel with a capacitor 14, the two series arms being in series resonance and the shunt arm in parallel resonance at the mid-frequency of the pass band.

As so far described, the arrangement has an "all pass" characteristic by virtue of the stop band of the filter 1 and the pass band of the filter 2 being complementary. In accordance with the present invention, however, a piezo-electric crystal 15 having a series resonance frequency within the pass band of the band-pass filter 2 is connected in parallel with the shunt arm of that filter. This crystal 15 is selected so that any other frequencies at which it is in series resonance lie outside the pass band of the band-pass filter 2 and thus have no effect on the overall characteristic of the filter arrangement which thus has only one relatively narrow stop band which is centered on the said frequency at which the crystal 15 is in series resonance.

It is desirable that the impedance between the points 16 and 17 across which the crystal 15 is connected should be as high as possible at frequencies in the pass band of the band-pass filter 2 in the absence of the crystal. In the second example, referring now to FIGURE 2, this is done by providing the band-pass filter 2 with two additional capacitors 18 and 19 so as to effect impedance transformation in known manner, the band-stop filter 1 being the same as in the first example.

Figure 2:
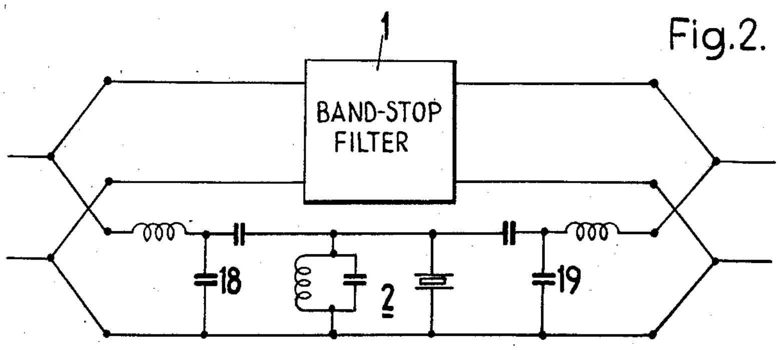

For the purpose of considering the characteristics of the band-pass filter 2 of the arrangements shown in FIGURES 1 and 2, the T-network thereof can be considered as being divided into two L sections so that there are effectively two identical shunt arms connected in parallel. The width of the stop-band of the filter arrangement may be increased by connecting a plurality of piezo-electric crystals between these two sections of the band-pass filter, the crystals being connected effectively in parallel with one another across the two shunt arms of the filter 2. The frequencies at which these crystals are in series resonance differ slightly from one another but in order to reduce interaction between the several crystals a decoupling resistance is preferably provided between each adjacent pair of crystals.

Figure 3:
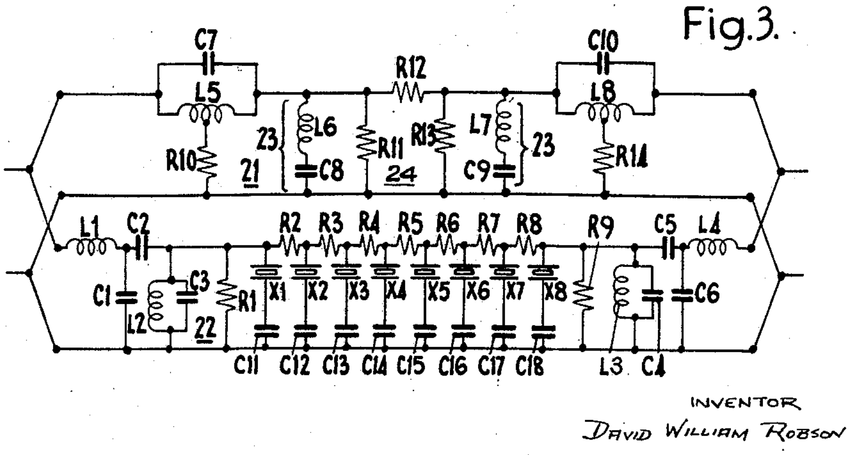

The third example of filter arrangement in accordance with the present invention that is now to be described, referring to FIGURE 3, incorporates this feature of having a plurality of parallel-connected piezo-electric crystals. This filter arrangement has a stop band centred on the frequency 308 kilocycles per second, the effective pass ranges being 60 to 300 kilocycles per second and 312 to 4276 kilocycles per second. The filter arrangement is designed to have a characteristic impedance of 75 ohms, the characteristic impedance of both the band-stop filter 21 and the band-pass filter 22 being designed to be $75\sqrt{2}$ ohms. In this arrangement the band-stop filter 21 is derived from the filter 1 of FIGURE 1 by dividing the shunt arm into two identical shunt arms 23 so as to form two L-sections and providing a resistive $\pi$-network 24 which is connected between the two L-sections. In addition resistors R10 and R14 are provided so as to correct for the dissipation in the inductors L5 and L8. The resistor R10, for example, is selected so as to compensate for the dissipation in the inductor L5 and make the impedance of the series arm that is formed by the capacitor C7 and inductor L5 as high as possible at its resonant frequency.

In the band-pass filter 22, eight crystals X1–X8 are effectively connected in parallel, each of these crystals being connected in series with an associated capacitor C11–C18.

The various component values are as follows:

| | |
|---|---|
| Inductors L1, L4, L6, and L7 | 277 microhenries. |
| Inductors L2 and L3 | 1640 microhenries. |
| Inductors L5 and L8 | 10.9. microhenries (centre tapped). |
| Capacitors C1 and C6 | 860 picafarads. |
| Capacitors C2 and C5 | 79 picafarads. |
| Capacitors C3 and C4 | 50 picafarads. |
| Capacitors C7 and C10 | 23500 picafarads. |
| Capacitors C8 and C9 | 940 picafarads. |
| Capacitors C11 to C18 | 30 picafarads. |
| Resistors R1 and R9 | 23500 ohms. |
| Resistors R2, R3, R4, R5, R6, R7, R8 | 2000 ohms. |
| Crystal X1 | 308.010 kilocycles per second. |
| Crystal X2 | 308.112 kilocycles per second. |
| Crystal X3 | 307.994 kilocycles per second. |
| Crystal X4 | 307.986 kilocycles per second. |
| Crystal X5 | 308.014 kilocycles per second. |
| Crystal X6 | 308.006 kilocycles per second. |
| Crystal X7 | 307.998 kilocycles per second. |
| Crystal X8 | 307.990 kilocycles per second. |

The values of the resistors R11, R12 and R13 are selected experimentally so that the losses of the filters 21 and 22 are complementary, thereby ensuring that apart from the stop band, the filter arrangement has a substantially uniform attenuation/frequency response.

For the purpose of adjustment the capacitors C1, C3, C4, C6, C8, C9 and C11 to C18 may be variable or alternatively small trimmer capacitors may be connected in parallel with the fixed capacitors shown, the capacitors C11 to C18 (or the associated trimmer capacitors) being utilised for fine adjustment of the resonant frequencies of the crystals X1 to X8.

I claim:

1. An electric filter arrangement comprising a band-pass filter having two points between which there is a relatively high impedance path at frequencies in the pass band of the filter, a band-stop filter connected in parallel relationship with the band-pass filter, said filters having complementary transmission characteristics whereby the frequencies passed by one filter are substantially those suppressed by the other filter, and in addition to said band-pass filter a piezo-electric crystal which is connected between said two points in the band-pass filter, one frequency at which said crystal is in series resonance lying within both the pass band of the band-pass filter and the stop band of the band-stop filter so that the filter arrangement has a relatively narrow stop band in the region of the said frequency at which the crystal is in series resonance, while other series resonances of the crystal lie at frequencies outside the pass band of the band-pass filter.

2. An electric filter arrangement according to claim 1 wherein the band-pass filter is provided with two impedance transformers, one on either side of the high impedance path, these transformers being arranged to increase the impedance of said high impedance path at frequencies in the pass band of the band-pass filter.

3. An electric filter arrangement according to claim 1 wherein one or more additional piezo-electric crystals are connected in parallel relationship with the previously mentioned crystal, all said piezo-electric crystals being series resonant at slightly different frequencies.

4. An electric filter arrangement according to claim 3 wherein each of the piezo-electric crystals has an associated capacitor in series with it, and a decoupling resistance is provided between each adjacent pair of piezo-electric crystals.

5. An electric filter arrangement comprising a band-pass filter in the form of a T-network the shunt arm of which has a relatively high impedance at frequencies in the pass band of the filter, a band-stop filter connected in parallel relationship with the band-pass filter, said filters having complementary transmission characteristics whereby the frequencies passed by one filter are substantially those suppressed by the other filter, and a piezo-electric crystal that is connected in parallel with said shunt arm of the band-pass filter, one frequency at which said crystal is in series resonance lying within both the pass band of the band-pass filter and the stop band of the band-stop filter so that the filter arrangement has a relatively narrow stop band in the region of said frequency at which the crystal is in series resonance, while other series resonances of the crystal lie at frequencies outside the pass band of the band-pass filter.

6. An electric filter arrangement according to claim 5 wherein the band-pass filter is provided with two impedance transformers, one on either side of the shunt arm, these transformers being arranged to increase the impedance of said shunt arm at frequencies in the pass band of the band-pass filter.

7. An electric filter arrangement comprising a band-pass filter which comprises shunt and series arms and which has a pair of input terminals and a pair of output terminals, a band-stop filter which has a pair of input terminals and a pair of output terminals and the stop band of which covers substantially the same frequency range as the pass band of said band-pass filter, means to connect in parallel the pairs of input terminals of the band-pass and band-stop filters, means to connect in parallel the pairs of output terminals of the band-pass and band-stop filters, a piezo-electric crystal which has a series resonance at a frequency in the pass band of the band-pass filter, and means to connect the piezo-electric crystal in parallel relationship with a shunt arm of the band-pass filter.

8. An electric band stop wave filter comprising a band pass filter section and a band-stop filter section each including inductors and capacitors, the said bandpass and bandstop filter sections being connected to form a network having no significant attenuation at any frequency, and a electromechanical resonating device which is sharply resonant at a given frequency lying within the pass band of the bandpass filter section, the said device being connected in the said bandpass filter section in such manner as to introduce a narrow stop band into the attenuation characteristic of the said bandpass filter section, said device having undesired additional resonances, and said bandstop filter section being designed with a width and position of the stop band thereof such that the frequency of at least one of the said additional resonances will lie outside said stop band.

References Cited in the file of this patent

UNITED STATES PATENTS

| | | |
|---|---|---|
| 1,530,537 | Affel | Mar. 24, 1925 |
| 1,742,252 | Holden | Jan. 7, 1930 |
| 1,967,250 | Mason | July 24, 1934 |
| 2,218,400 | Le Bel | Oct. 15, 1940 |
| 2,459,019 | D'Heedene | Jan. 11, 1949 |